Sept. 15, 1964   E. C. ZIMMERMAN   3,149,223
ENERGY SOURCE FIXTURE AND COMPONENTS THEREFOR
Filed Dec. 12, 1962   4 Sheets-Sheet 1

INVENTOR.
EDWARD C. ZIMMERMAN
BY
Cromwell, Greist and Warden
ATTORNEYS.

Sept. 15, 1964  E. C. ZIMMERMAN  3,149,223
ENERGY SOURCE FIXTURE AND COMPONENTS THEREFOR
Filed Dec. 12, 1962  4 Sheets-Sheet 2

INVENTOR.
EDWARD C. ZIMMERMAN
BY
Cromwell, Greist and Warden
ATTORNEYS.

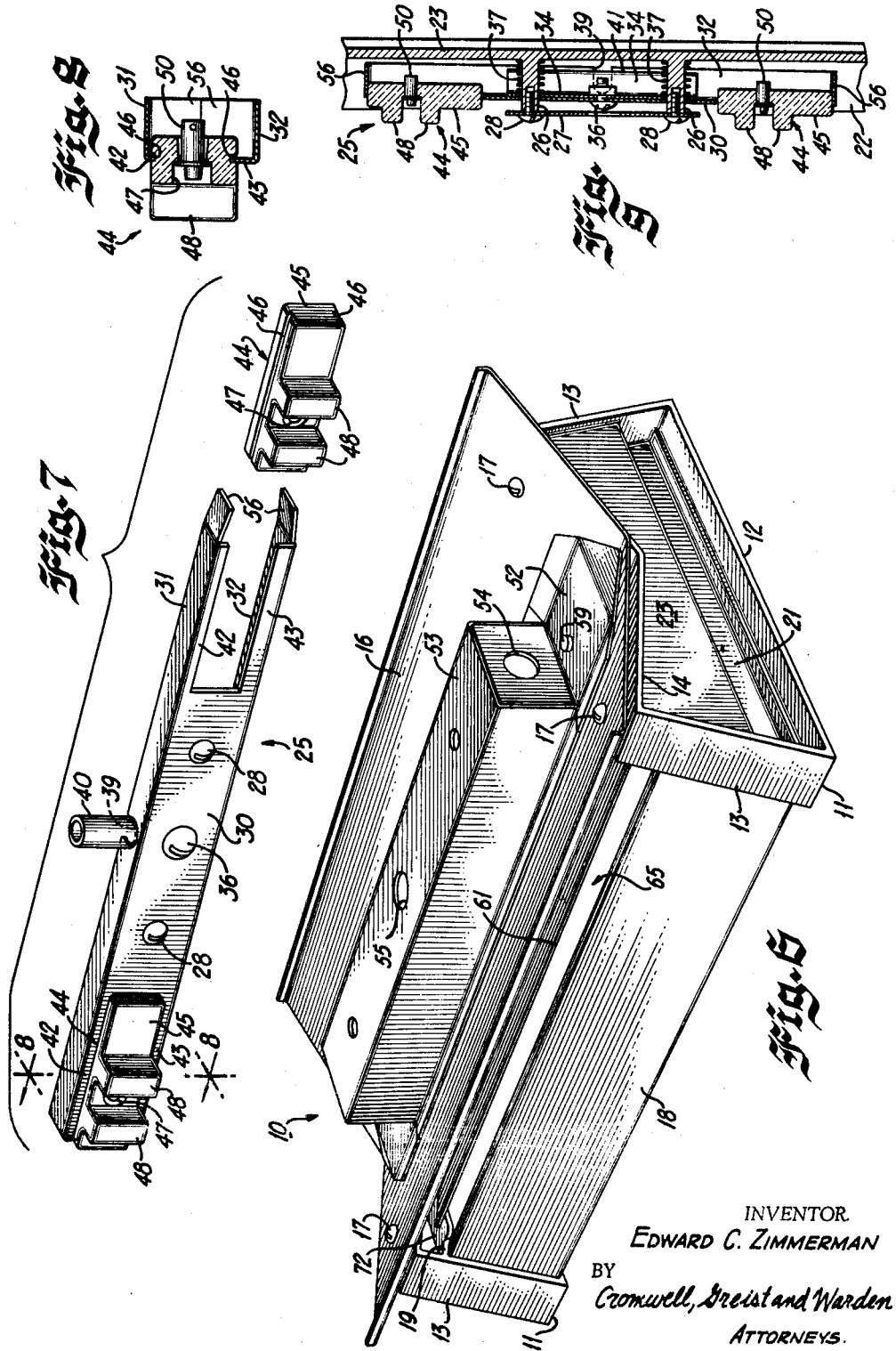

Sept. 15, 1964     E. C. ZIMMERMAN     3,149,223
ENERGY SOURCE FIXTURE AND COMPONENTS THEREFOR
Filed Dec. 12, 1962     4 Sheets-Sheet 4
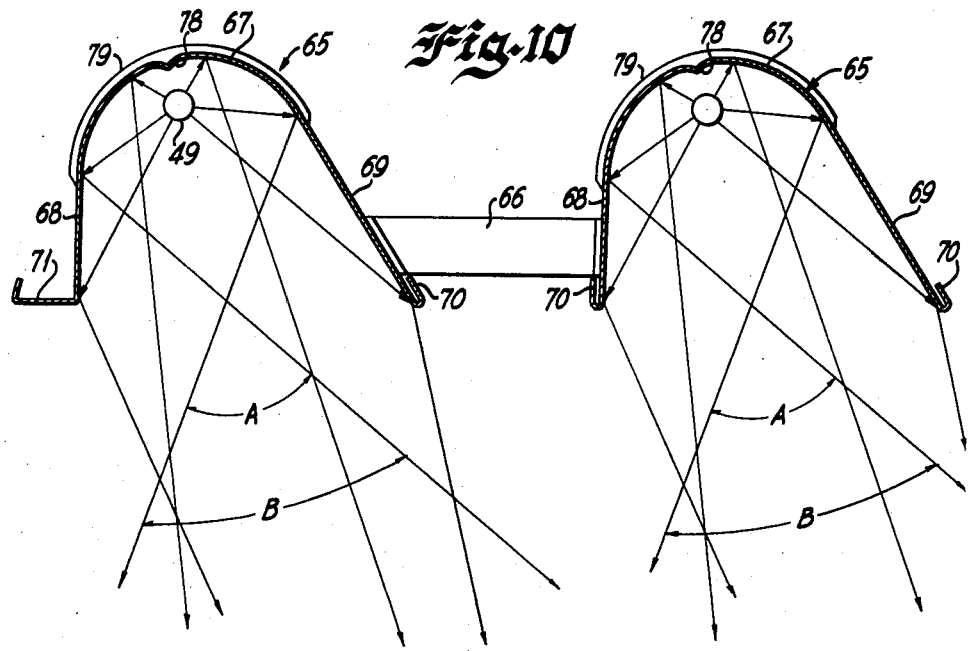
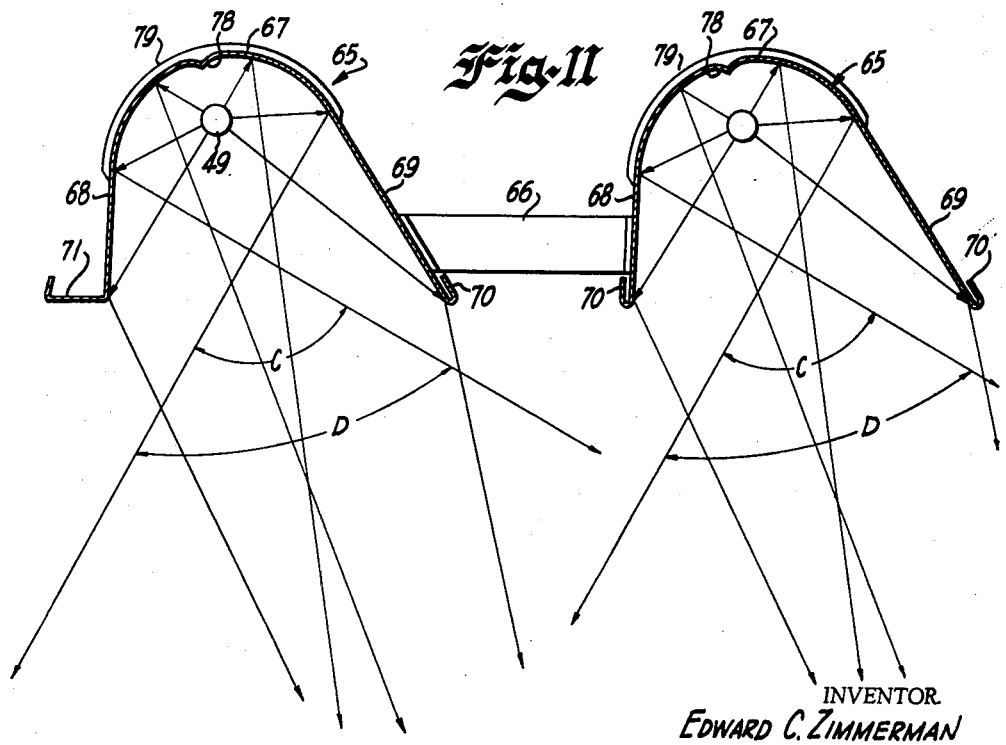
INVENTOR.
EDWARD C. ZIMMERMAN
BY
Cromwell, Greist and Warden
ATTORNEYS.

United States Patent Office 3,149,223
Patented Sept. 15, 1964

3,149,223
ENERGY SOURCE FIXTURE AND
COMPONENTS THEREFOR
Edward C. Zimmerman, Evanston, Ill., assignor to Patent License Corporation, Chicago, Ill., a corporation of Illinois
Filed Dec. 12, 1962, Ser. No. 244,145
5 Claims. (Cl. 219—347)

This invention is directed to a new and improved energy source fixture and components for the efficient utilization of energy for heating and lighting purposes. The invention is also directed to specific energy source reflection and mounting means, such means being particularly useful in the basic fixture structure of the invention. More specifically, the invention is directed to means for the efficient utilization of infrared energy for both lighting and heating purposes, the invention dealing basically with an infrared fixture and components therefor of unique constuction and arrangement.

Heating by use of infrared energy is being used to a greater extent under a wider variety of conditions in view of the basic advantage of infrared energy, namely, object heating as distinguished from air or space heating. The relatively high fixture temperatures produced by infrared heating have imposed certain limitations with regard to fixture components and wiring used in mounting the energy source. In order to meet basic safety requirements, such fixtures must use more costly heat resistant wire such as of the type insulated with a covering of silicone and glass. Such wire will withstand temperatures on the order of 394° F. whereas standard building or line wire includes insulation rated to withstand no more than about 194° F. Often this situation requires special rewiring of building areas in which infrared fixtures are used. Additionally, the high temperatures produced by infrared heating fixtures impose limitations on the manner in which such fixtures can be operatively mounted for use. For example, such fixtures ordinarily cannot be mounted directly on wood ceilings, walls or the like as the rated allowable temperature for such material is also 194° F. Accordingly, the methods and surfaces used in the mounting of infrared source fixtures are limited and any direct or flush mounting requires the presence of adequately rated non-combustible building material thus limiting the freedom of use of such fixtures in the many fields of application for infrared heating.

Infrared heating has been found particularly useful in large areas where forced hot air heating is either impractical or quite expensive. For example, infrared heating is particularly useful in large plants with suitable fixtures being arranged to directly heat the workmen along an assembly line. Another example of advantageous utilization of infrared heating involves outdoor heating and illumination along the sides of buildings directly over display windows. With the latter use, the fixtures not only function to warm the shopper but also aid in maintaining the immediate sidewalk area free from moisture, snow and the like. These are a few examples of the many uses of infrared heating and free use of existing fixtures has been limited by reason of the high temperatures developed in the fixtures.

It is an object of the present invention to provide a new and improved infrared energy reflector and fixture therefor which co-operatively permit more extensive and efficient utilization of infrared energy for both heating and lighting purposes.

Another object is to provide a new and improved energy source fixture and components therefor providing for effective dissipation and control of undesirable heat generated in the fixture without detracting from efficient utilization of controlled energy emitted therefrom.

Still another object is to provide a new and improved reflector means for use with an energy source, the reflector means providing for improved emission control of energy from the source and being of uncomplicated economical design.

Still another object is to provide a new and improved mounting means for tube-type energy sources, the mounting means being in the form of a socket bar including features permitting ready adjustability of the sockets thereof for variable source positioning, and further providing for ease of source mounting and replacement.

Other objects not specifically set forth will become apparent from the following detailed description of the invention made in conjunction with the accompanying drawings wherein:

FIG. 4 is a fragmentary longitudinal section of one end of the fixture as viewed generally along line 4—4 in FIG. 3;

FIG. 5 is an enlarged fragmentary section of an end wall and socket bar of the fixture as viewed generally along line 5—5 in FIG. 3;

FIG. 6 is a perspective of the fixture as viewed from the top along one side thereof, FIG. 7 is an exploded perspective of the socket bar of the invention;

FIG. 8 is a transverse section of one end of the socket bar as viewed generally along line 8—8 in FIG. 7;

FIG. 9 is a longitudinal plan section of the socket bar similar to the illustration of the socket bar in FIG. 4, this view illustrating operative use of the socket bar;

FIG. 10 is a combination end view of the reflector of the invention and a diagrammatic view of the energy source and field of energy established by the reflector; and FIG. 11 is a view similar to FIG. 10 but illustrating a repositioning of the energy source and the resultant effects thereof.

Figure 1:
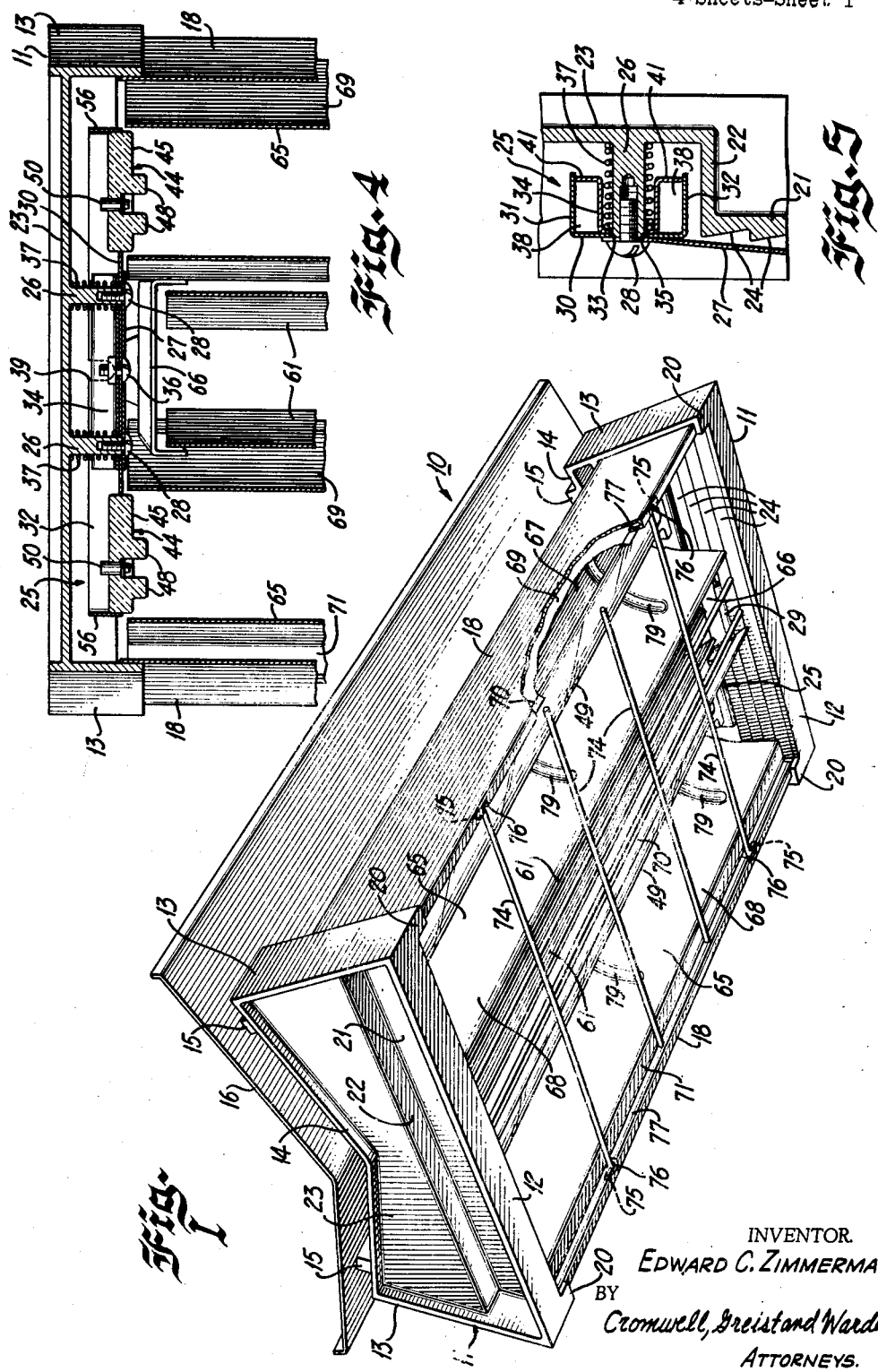
FIG. 1 is a partly sectioned perspective of the preferred form of fixture of the invention as viewed from the bottom adjacent one end thereof.

Referring to FIGS. 1–3 and 6, the fixture 10 basically comprises a pair of end walls 11 which may be readily cast from aluminum and each of which includes a flat bottom flanged portion 12, upwardly converging flanged side portions 13 and a top flange V-shaped portion 14. Each top flanged portion 14 is in the form of a recessing V and includes projecting bosses 15 supporting thereon a wing-shaped top panel 16 formed with upwardly diverging leg portions which are arranged generally parallel to the diverging top surfaces of the top flanged portion 14. Suitable fasteners 17 attach the top panel 16 to the bosses 15 thus placing the top panel in upwardly spaced relation relative to the end walls 11. Channel shaped side plates 18 are nested at opposite ends between vertically spaced integral flange portions 19 and 20 (FIG. 3) of the end walls 11 and define with the end walls and top panel 16 a fixture housing which is vented or is formed with vent openings along both sides and ends thereof immediately below the top panel 16.

Figure 2:
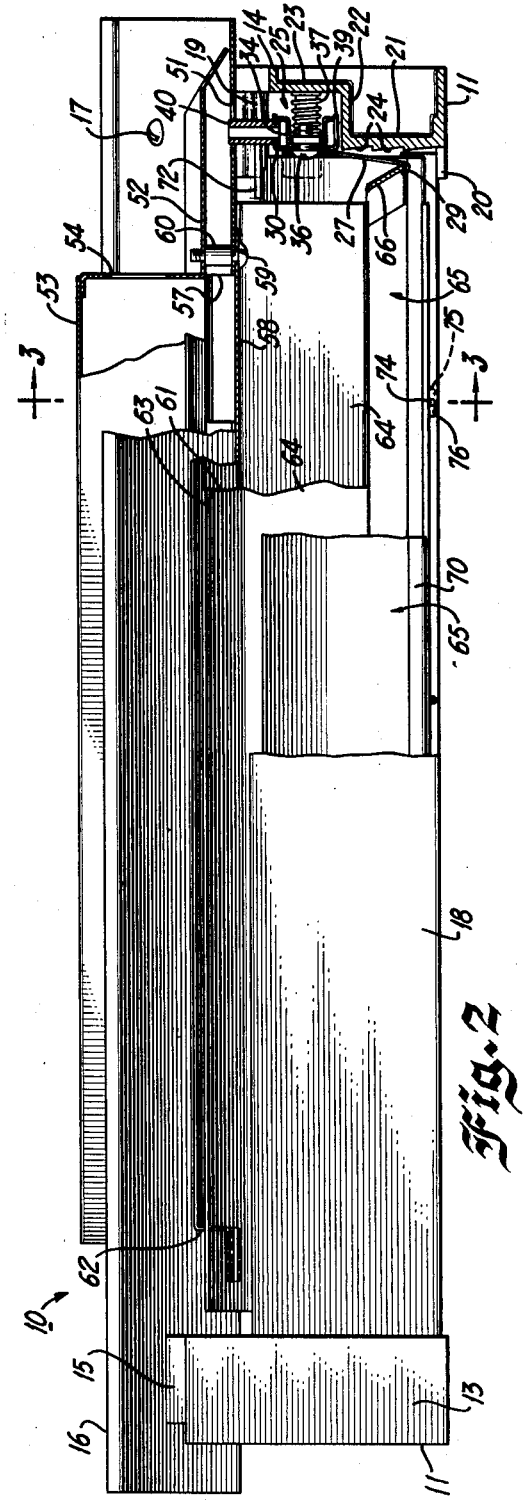
FIG. 2 is a partly sectioned side elevation of the fixture of FIG. 1 illustrating components thereof progressively broken away.

Each end wall 11 as best shown in FIG. 2 is formed with a central end panel portion of step-like configuration having an inwardly positioned vertical wall section 21, a horizontal outwardly directed wall section 22 and an outwardly positioned vertical wall section 23. The inner surface of the wall section 21 is provided with a specular finish, such as by buffing or the like, this surface defining a plurality of horizontal step-like specular surface portions 24 which are arranged to direct energy downwardly at long angles in a direction longitudinally of the fixture to prevent glare or the like from a position below the fixture. The outermost vertical wall section 23 mounts thereon a transverse socket bar unit 25.

Figure 3:
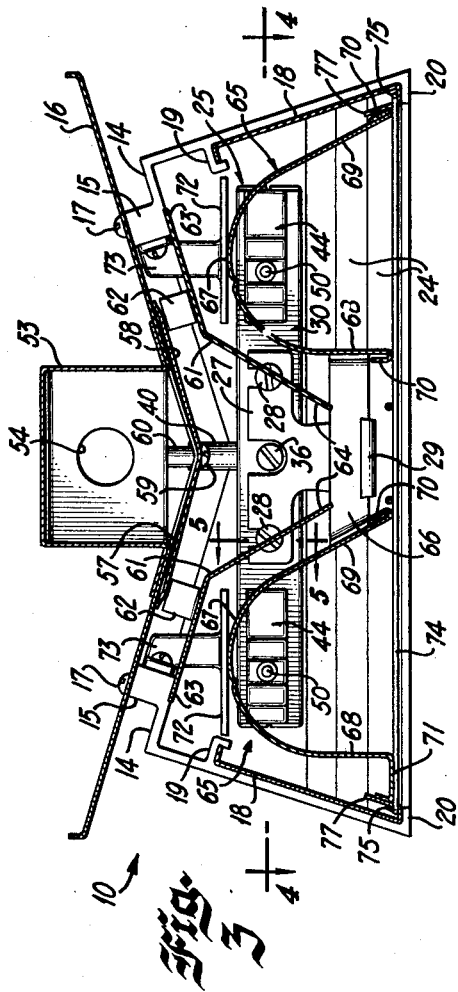
FIG. 3 is a transverse section of the fixture as viewed generally along line 3—3 in FIG. 2.

Referring particularly to FIGS. 4 and 5, each end wall 11 along the vertical wall section 23 thereof is formed with inwardly projecting bosses 26 having attached across the outer ends thereof a metallic hanger plate 27. FIG. 3 illustrates the hanger plate 27 as including slotted portions through which fasteners 28 extend into the bosses 26, the hanger plate further including a depending hanger tongue-like portion including at the bottom thereof a reversed hook-like portion 29 for a purpose to be described. Immediately rearwardly of the hanger plate 27 is a transverse channel member 30 which is best shown in FIG. 7. This channel member includes a vertical face portion integrally formed with top and bottom flanges 31 and 32, respectively. A pair of spaced apertures 33 extend through the vertical face of the channel member 30 and are dimensioned to be slidably received about the bosses 26 of an end wall.

Referring again to FIGS. 4 and 5, the central portion of the channel member 30 has nested therein a spring seat and wire guide member 34 which is also of channel shape and which is formed with apertures 35 aligned with the apertures 33 and slidably received on the bosses 26. FIG. 4 illustrates the guide 34 as being fixed to the vertical face of the channel member 30 centrally thereof by suitable fastener means 36. The guide 34 defines a seat for a coil spring 37 received about each boss 26 and functioning to constantly urge the channel member 30 outwardly into abutment with the hanger plate 27 which in turn is fixed to the outer ends of the bosses 26 as previously described. In this respect the hanger plate 27 and the fasteners 28 function to retain the channel member 30 on the bosses 26.

FIGS. 2 and 5 best illustrate the functioning of the guide 34 in also defining within the channel member 30 above and below the bosses 26 a pair of longitudinal wire receiving areas 38 to direct the wire of the fixture past the springs 37 and out of contact therewith. Each flange 31 and 32 of the channel member 30 as best shown in FIGS. 2 and 7, is formed with a central slot 39 in one of which is received a wire feeding nipple 40. FIG. 2 illustrates one end of the nipple 40 being grooved to be held by the edges of the slot 39 and to be retained therein by one of the vertical flange portions 41 of the guide 34. With this arrangement, the channel member 30 may be readily detached from the bosses 26 and flipped over or turned 180° to be completely reversed for a purpose to be described. The wire feeding nipple 40 may then be reversed to be positioned in the slot 39 of the horizontal flange portion 32 of the channel member with the guide 34, by reason of its symmetry, performing the same function for wire feeding purposes along the interior of the channel member 30.

FIGS. 7 and 8 illustrate the channel member 30 as including at opposite ends thereof longitudinal slot-like recesses which are of lesser width than that of the vertical face of the channel member so that vertically projecting tongue portions 42 and 43 define the side margins of each recess. Each tongue portion 42 is of lesser width than the co-operating tongue portion 43 thus placing the longitudinal axis of each recess offset from the main longitudinal axis of the channel member 30. The opposite end recesses are transversely aligned with their longitudinal axes coinciding thus placing the narrow tongue portions 42 of each recess in the top position as viewed in FIGS. 7 and 8 and the wider tongue portions 43 in the bottom position.

Removably and slidably received in each recess at each end of the channel member 30 is a socket 44 formed from any suitable non-conducting material such as porcelain or the like. Each socket 44 includes a rectangular and elongated base portion 45 formed along opposite sides thereof with longitudinal grooves 46 adapted to receive therein the tongue portions 42 and 43. Offset to one side of the geometric center of each socket 44 is a contact pin aperture 47 located between projecting shoulder-like guides 48 between which the connection end of a well known type of energy source tube 49 (FIG. 1) is received. FIGS. 4, 8 and 9 illustrate the mounting of copper contact pins 50 in the socket apertures 47, such pins being of known type and adapted for circuit making contact with appropriate ends of a source tube. The contact pins 50 are suitably wired through the interior of the channel member 30 and the wiring channels 38 are previously described, the wires per se not being illustrated.

The permanent wiring of the fixture will extend upwardly through the nipple 40 which, as best shown in FIGS. 2 and 3, projects upwardly through a suitable opening 51 in the top panel 16 and into communication with an end portion 52 of a main wire housing 53 mounted on the top surface of the top panel 16. FIGS. 2 and 6 illustrate the end portions 52 of wire housing being of reduced depth as compared to the main housing portion 53, the latter portion being adapted to receive through suitable apertures 54 or 55 external wiring for splicing with the fixture wiring therein. In this respect the enlarged main housing portion 53 provides adequate space to accommodate splices not only with regard to external building wiring but also for endwise interconnection of a plurality of fixtures 10 with the interconnecting wires extending longitudinally of the fixtures through the adjacent end openings 54 in the main housing portions 53.

Referring again to FIG. 7, the ends of the horizontal flange portions 31 and 32 of the channel member 30 are formed with projecting tab-like locking flanges 56 which may be bent into and out of socket confining relation. A socket 44 is slidably inserted in a recess at the end of the channel member 30 and the locking flanges 56 may be bent inwardly over the outer end surface of the base 45 of the socket to hold the socket in operative position. For socket removal purposes, the locking flanges 56 may be bent outwardly to free the socket and the same may be removed from the recess and flipped over through an arc of 180° and reinserted followed by relocking. With this particular arrangement, bearing in mind the offsetting of the socket aperture 47 relative to its geometric center, the transverse spacing or positioning of the energy source tubes 49 may be varied using the particular socket bars 25 described. Such transverse variable positioning provides for accommodation of variation in the direction of energy emitted from the fixture to one side or the other without changing the basic structure or components of the fixture. The reversability of the socket bar 25 also permits vertical raising or lowering of the sockets 44 to accommodate variations in fixture energy field definition. The flipping of the socket bar 25 through an arc of 180° as previously described from the position of the bar illustrated in FIGS. 7 and 8 will result in the vertical lowering of the sockets 44 by reason of their offset position along the channel member. These features of variable energy source tube positioning are available with each fixture without the necessity of component addition or replacement and the advantages arising therefrom will be subsequently described in greater detail.

The spring mounting of the socket bar in the manner previously described permits a rocking or tilting of the bar as well as substantial depression thereof for tube mounting and dismounting purposes. With the use of a plurality of the fixtures 10 to provide infrared heating and lighting effects, such as in large plant areas, the fixtures will ordinarily at least be aligned in end-to-end relation thus providing for continuity of heat and light emission. Under such circumstances it is desirable to provide as much longitudinal continuity between the sources of adjacent fixtures as is possible and the mounting means for the source tubes must preferably utilize as little space as possible. In this respect the end walls 11 of the fixture include the recessed socket bar mounting areas involving the vertical wall sections 23 as previously described and additionally each socket bar is spring mounted for the purpose of reducing the amount of longitudinal space necessary for ready and efficient insertion and removal of energy source tubes.

FIG. 9 illustrates a socket bar 25 in its tilted position with the uppermost socket 44 as viewed being pressed inwardly a greater distance than the lowermost socket 44. This tilting action readily provides adequate longitudinal space for insertion and removal of an energy source tube without resultant depression of the opposite end socket to an extent that the companion tube drops by its own weight from the fixture. The particular use of a pair of centrally located springs 37 functions, in effect, to divide the compression force necessary for efficient operation of a socket bar thus providing less spring pressure resisting the insertion of the first energy source tube in the fixture or, conversely, the removal of the first energy source tube from the fixture.

FIGS. 2 and 3 illustrate the central longitudinal portion of the top panel 16 as being provided with an opening 57 in communication with the interior of the main housing portion 53 constituting the splicing area. The top panel 16 is readily separated from the remainder of the fixture by removal of the fasteners 17 and in this manner any splicing necessary between the line wires and the fixture wires can be readily attended to through the opening 57. A cover plate 58, which is generally wing-shaped to conform to the configuration of the top panel, is received over the inner central portion of the top panel in covering relation with the opening 57 and is suitably attached to the reduced end portions 52 of the wire housing by fasteners 59 extending upwardly through spacer sleeves 60 located between the top panel 16 and the reduced end portions 52 of the wire housing.

As best shown in FIG. 3, a pair of longitudinally continuous and generally V-shaped baffle plates 61 are mounted within the housing in transversely spaced side-by-side relation. The baffle plates 61 are supported from the cover plate 58 through vertical end tabs 62 suitably welded or otherwise fixed to the respective plates. Each baffle plate 61 includes an upwardly and outwardly inclined leg segment 63 which overlaps the top flange portions 14 of the end walls 11 thus in this area sealing off the interior of the housing longitudinally thereof in spaced relation to the top panel 16. The remaining leg segment 64 of each baffle plate 61 is inclined downwardly and inwardly toward the center of the housing with the adjacent leg segments 64 converging toward one another centrally of the housing but at their lower edges remaining in substantially spaced relation. With the baffle plates 61 arranged in the manner illustrated, the interior of the fixture housing is, in effect, divided into two transversely spaced longitudinal energy source mounting areas with the baffle plates shielding the top panel 16 and the wire receiving housing portions 52 and 53 from these areas. The upwardly inclined leg segments 63 of the baffle plates 61 are spaced vertically below the wing sections of the top panel 16 and below or intermediate the openings defined along the sides and ends of the fixture between the end walls 11, side plates 18 and top panel 16. This arrangement provides for a plurality of venting passages along all of the upper margins of the housing immediately below the top panel 16 and wire housing portions 52 and 53.

The particular arrangement of the baffle plates within the fixture and relative to the energy source mounting areas permits greater latitude in the operative mounting of the fixture as well as in the electrical connection thereof to standard power lines of conventional structures. As will be described in greater detail, each energy source mounting area of the fixture includes a special type of reflector 65 which encases or substantially encloses the energy source tubes 49 (FIG. 1) and provides for the reflection of energy downwardly through the open bottom of the fixture housing. While an infrared energy source functions basically to heat objects instead of the air in its path of emission, naturally the elements of the fixture itself become heated to substantial temperatures. For example, the reflectors 65 when formed from aluminum, as is preferred, might well become heated to a temperature of at least about 500° F. The heating of the fixture elements results in the heating of the air within the fixture and at least a portion of the air directly below the fixture. This creates an upward flow of at least warm air which establishes a continuous air flow path upwardly between the transversely spaced bottom edges of the leg segments 64 of the baffle plates 61. This upward draft as a result of natural convection is guided upwardly and outwardly across the bottom surface of the top panel 16 toward the various vent openings formed between the top panel and the upper leg segments 63 of the baffle plates and the end walls 11. Additionally, by reason of the spacing of the baffle plates 61 above the reflectors 65, a convection air flow of hot air occurs in a direction toward the side plates 18 and out through the side openings defined between the top edges of the side plates and the top leg segments 64 of the baffle plates 61. The arrows of FIG. 6 illustrate these various paths of air flow from within the fixture outwardly thereof. While the baffle plates are effective in controlling air flow, they also perform the important function of preventing direct radiation of the top panel. The spacing between the end walls 11 and the top panel 16 not only provides for a temperature controlling air flow but also prevents the direct transmission of heat from the very hot socket areas to the top panel.

In the foregoing manner the much hotter air present in the fixture directly in contact with the reflectors 65 and below the baffle plates 61 is directed outwardly from the fixture along side areas thereof which are spaced substantially below the top panel 16. In this respect the hottest portion of the air of the fixture does not actually contact the top panel 16. The air which flows between the baffle plates 61 and the top panel 16 is generally at a lower temperature and by reason of the continuous air flow, the top panel 16 does not become substantially heated. By way of example, the baffle plates 61 may reach a temperature of approximately 200° F. This means that the temperature of the top panel and associated wiring housing portions 52 and 53 will never reach a temperature equal to that of the baffle plates 61 and, therefore, will always be maintained at a temperature below the basic limiting temperature of 194° F.

The temperature control arrangement described permits ready mounting of the fixture 10 on all basic types of building materials including combustible wood and the like. The arrangement also permits ready splicing of relatively low temperature resistant building lines to the high temperature resistant wiring of the fixture in the main wiring housing portion 53. The location of the housing portion 53 above the top panel 16 protects the same from the effects of high temperature to an extent that the allowable temperatures for common building wiring are not exceeded. The particular wing shape of the fixture components, especially the baffle plates and top panel, provides for natural convention of heat from the fixture through natural air flow thus creating a "chimney" effect. No special means are necessary to induce air flow, such as fans or the like, and the fixture will inherently function to control the temperature of its critical components during operative use of the fixture.

The foregoing arrangement is of particular utility with regard to use of the fixture as an infrared energy source. Readily available tubular quartz infrared lamps which have a filament temperature of about 5000° F. may typically be used. Such lamps are quite efficient for infrared heating purposes and also generate 6 to 8 lumens of light per watt, for example, when burned at full voltage thus substantially supplementing existing light or completely eliminating the need for additional lighting when an adequate number of fixtures are in use. Approximately 20% of the heat of the sources may be absorbed by the fixture but this substantial amount of heat is readily accommodated by reason of the convection type air flow arrangement described above.

Referring particularly to FIGS. 1 and 3, the reflectors 65 are of elongated, generally U-shaped configuration opening downwardly through the bottom opening of the housing. The reflectors 65 are arranged in transversely spaced relation extending longitudinally of the fixture and are suitably interconnected at opposite ends by transverse webs 66 which are supported by the hook portions 29 of the hanger members 27 (FIGS. 2 and 3). The lower projecting portion of each hanger member 27 is angled slightly outwardly away from the adjacent end wall 11 and is sufficiently resilient to permit ready reception of the assembly of reflectors within the fixture for engagement of an end web 66 thereof by the hook portion 29. Similarly, the reflectors 65 may be readily dismantled from the fixture for reversing of the reflectors in the fixture to provide for controlled redirection of the fields of light from the sources.

Each reflector 65 basically comprises a curved top portion 67 terminating in a pair of substantially flat and divergent portions 68 and 69. Marginal areas 70 of the flat portions 68 and 69 are reversely folded to provide smooth edge areas and one of the flat portions 68 is formed with a relatively flat radially outwardly directed supporting flange 71.

The fixture 10 also includes a pair of abutment plates 72 which are supported by vertical arm portions 73 suitably fastened to the bosses 15 of the end walls 11. The plates 72 extend horizontally across the ends of the fixture immediately inwardly of the end walls 11 as shown in FIGS. 2 and 3 and function basically as abutment means for opposite top end portions of the reflectors 65 to provide for proper seating of the reflectors within the fixture. The plates 72 also function to block off or eliminate stray light emission from the ends of the fixture. In this respect it will be noted that the plates 72 overextend the ends of the reflectors 65 and the adjacent socket bars 25.

The fixture 10 is completed by the provision of a hinged guard grid or guard 74 shown in FIGS. 1 and 3. The guard includes a plurality of interconnected longitudinal and transverse small rods or wires which extend across the bottom opening of the housing directly below the reflector unit. Right angled opposite end portions 75 of certain of the transverse guard rods are received in slots 76 formed in the bottom surface portions of reversely folded bottom margins 77 of the side plates 18. The rods of the guard are adequately flexible to permit ready disengagement of the right angled end portions 75 from at least some of the slots 76 to permit a downward pivoting of the guard out of closing relation with the bottom opening of the housing. In other words the right angled ends 75 of the rods along one side of the fixture would be disengaged from the slots 76 thus leaving the remaining opposite right angled ends 75 to function as hinges for downward pivoting of the guard. This guard may be useful in the positive positioning of the reflectors 65 within the fixture for proper energy field definition. The guard in this respect cooperatively functions with the abutment plates 72 to hold the reflectors therebetween.

FIGS. 10 and 11 illustrate the reflectors 65 in greater detail and diagrammatically set out the energy fields defined thereby. The circular or curvilinear top portion 67 of each reflector 65 is defined by a series of arcuate segments having centers of curvature which are offset from the center of the associated energy source 49. This particular design feature is basically typical of hood or curvilinear reflector portions for the purpose of avoiding the reflection of energy back into the source or the center thereof. The juncture of the different arcuate segments at the top of each reflector is defined by a substantially V-shaped indentation 78 which extends longitudinally of the reflector and also functions to reinforce the same, bearing in mind that each reflector is formed from thin sheet material and by reason of its configuration can be readily stamped or otherwise efficiently formed at low cost. The indentation 78 also prevents reflection of energy back into the source. Each reflector may further be reinforced or rigidified by the provision of a plurality of transverse groove-like offsets 79 formed at spaced intervals along the top portions thereof, these reinforcing offsets being also illustrated in FIG. 1.

The arcuate segments of the top portion 67 of the reflector 65 extend rearwardly and to each side of the associated energy source 49 and join the substantially flat surfaces 68 and 69 which extend downwardly therefrom and diverge from one another. The flat surfaces 68 and 69 are arranged in tangential relation to the arcs of the immediately adjacent curvilinear sections of the top portions 67 of the reflector. The complete inner surface portion of each reflector is specular to provide for the reflection of energy as illustrated diagrammatically in FIGS. 10 and 11.

A unique feature of the reflector configuration resides in the provision of the flat surfaces 68 and 69 diverging downwardly as tangents to the immediately adjacent arcuate segments of the top portion 67 of the reflector. The regularity of the arcuate shape of the top portion 67 eliminates "hot spots" in the reflected field thus providing for the defining of a uniform field of reflected energy. The flat surfaces 68 and 69 also do not create any "hot spots" and function to define an additional reflected field of energy which is intended to at least substantially coincide with the field of energy established by the circular top portion 67. In other words, the flat surface portions 68 and 69 are arranged relative to the circular top portion 67 to reinforce the reflected field of energy defined by the top circular portion. This results in a building up of the total field strength thus increasing the effectiveness of the infrared energy in the heating of objects below the same and the full utilization of the illumination properties of the field. A particularly advantageous result is that of further reducing the possibility of any "hot spots" by the averaging effect of one field coinciding with another. Duplication of the basic energy field thus provides for the elimination of striations or unevenness of the total field. Energy field A of FIG. 10 is defined by the circular top portion 67 and is duplicated by the field B defined by the flat surface portions 68 and 69.

FIGS. 3, 10 and 11 illustrate the forming of the reflectors 65 and the positioning thereof in the fixture to define basic energy fields which are angled downwardly and to one side of the fixture. This is a form of asymmetrical energy emission and it will be borne in mind that the reflectors 65 may be readily shaped to provide symmetrical emission for reflection directly downwardly from the overhead fixture. Similarly, the reflector unit including the reflectors 65 interconnected by the webs 66 may be reversed 180° in the fixture to thus redirect the fields of energy to the opposite side of the fixture in a downward direction. In varying the use of the fixture in this respect it is necessary to relocate the sources 49. This is readily accomplished by removing the sockets 44 from the socket bars 25 in the manner described above in connection with FIG. 7 and reversing the sockets 180° followed by reinserting the same within the respective recesses of the channel member 30. The off-center positioning of the socket apertures 47 provides for transverse repositioning of the same to relocate the sources within the fixture.

Complete reversing of the socket bars 25 through arcs of 180° as previously described will provide for a raising or lowering, as the case may be, of the sockets 44 to thus variably position the sources 49 in a vertical direction relative to the reflectors 65. FIG. 10 illustrates the sources 49 in their raised position conforming to the position of the socket bar 25 of FIG. 7. Reversing of the socket bars through 180° will result in the repositioning of the sources 49 vertically below their original positions as shown in FIG. 11. In this manner the extent of maximum energy concentration of the field of energy defined by the sources and reflectors can be varied within the fixture itself and without the necessity of utilizing additional or replacement parts. By way of example, the particular fixture structure illustrated is capable of defining fields of energy ranging from approximately 40° to 90°, this range constituting the field angle measured from maximum intensity to one-half maximum intensity in accordance with conventional practices. FIG. 10 illustrates the positioning of the sources 49 relative to the reflectors in defining a 60° field and FIG. 11 illustrates the lowered positioning of the sources 49 to define a 90° field, the circular portions 67 defining a wider field C and the flat portions 68 and 69 defining the overlapping field D. It will also be noted that by the arrangement of a plurality of sources and reflectors in longitudinally extending side-by-side relation the fields of the individual energy sources may be made conjoint or caused to overlap to any extent desired.

Obviously certain modifications and variations of the invention as hereinbefore set forth may be made without departing from the spirit and scope thereof, and therefore only such limitations should be imposed as are indicated in the appended claims.

I claim:

1. A fixture for the mounting of a heat and light energy source and the reflection of heat and light energy emitted downwardly from said source, said fixture comprising a housing provided with vent openings adjacent the top portion thereof, heat and light energy source mounting means in said housing below the top portion thereof, reflector means in said housing above said energy source mounting means, and baffle means overlying said reflector means between the same and the top portion of said housing and extending toward said vent openings, said baffle means being arranged about said reflector means to establish by natural convection an air flow upwardly and across the top portion of said housing to said vent openings to control the temperature of at least the top portion of said housing.

2. The fixture of claim 1 wherein said housing, reflector means and baffle means are elongated, said housing including a plurality of transversely spaced reflector means and baffle means with said baffle means overlying said reflector means in spaced relation thereto and projecting downwardly between said reflector means.

3. An energy source fixture adapted for overhead mounting closely adjacent a supporting surface, said fixture comprising an elongate housing including side and end walls and a generally downwardly convergent wing-shaped top panel, vent openings in said housing immediately below said top panel adjacent the edges thereof, a wiring housing carried by said top panel and cradled above the same, a pair of elongate baffle plates in said housing below said top panel and extending adjacent said vent openings, said baffle plates being generally V-shaped and transversely spaced with top leg portions paralleling the wing sections of said top panel and bottom leg portions converging downwardly in said housing, elongate reflectors in said housing in spaced relation below each of said baffle plates, elongate energy source means extending longitudinally within said reflectors, and energy source mounting means carried by said end walls at opposite ends of said reflectors.

4. The fixture of claim 3 wherein said energy source mounting means each comprises a transverse bar carrying spaced socket means therealong, and spring means resiliently mounting said bar relative to an end wall for rocking of said bar in a direction longitudinally of said fixture during insertion or removal of energy source means.

5. In an energy supplying fixture wherein a plurality of transversely spaced elongate tube-like energy sources are mounted at opposite ends between mounting means forming a part of said fixture, the improvement comprising said mounting means including a transverse socket bar carrying a plurality of sockets spaced longitudinally therealong, and spring means mounting said bar relative to said mounting means, said spring means being spaced along said bar to permit resilient tilting of said bar longitudinally of said fixture as well as uniform retraction thereof toward said mounting means.

References Cited in the file of this patent

UNITED STATES PATENTS

| | | |
|---|---|---|
| 682,949 | McElroy | Sept. 17, 1901 |
| 1,393,368 | Henry | Oct. 11, 1921 |
| 1,873,053 | Shaw | Aug. 23, 1932 |
| 2,023,517 | Creager et al. | Dec. 10, 1935 |
| 2,223,331 | Roesch et al. | Nov. 26, 1940 |
| 2,262,157 | Beals | Nov. 11, 1941 |
| 2,321,701 | Potter | June 5, 1943 |
| 2,323,073 | Netting | June 29, 1943 |
| 2,338,077 | Scribner | Dec. 28, 1943 |
| 2,603,738 | Schubert et al. | July 15, 1952 |
| 2,627,016 | Hollinger | Jan. 27, 1953 |
| 2,715,216 | Howenstein | Aug. 9, 1955 |
| 2,775,743 | Goddard | Dec. 25, 1956 |
| 2,987,603 | Thomson | June 6, 1961 |

FOREIGN PATENTS

| | | |
|---|---|---|
| 459,613 | Germany | Feb. 22, 1929 |
| 530,234 | Germany | July 24, 1931 |
| 456,461 | Great Britain | Nov. 10, 1936 |